United States Patent

Hess

[15] 3,662,831

[45] May 16, 1972

[54] METHOD FOR SEALING EARTH FORMATIONS

[72] Inventor: Patrick H. Hess, Diamond Bar, Calif.

[73] Assignee: Chevron Research Company, San Francisco, Calif.

[22] Filed: Aug. 28, 1970

[21] Appl. No.: 68,032

[52] U.S. Cl. ............................................................166/295
[51] Int. Cl. ....................................................E21b 33/138
[58] Field of Search..........................166/295, 300; 61/36 R; 260/88.5

[56] References Cited

UNITED STATES PATENTS

| | | | |
|---|---|---|---|
| 2,307,843 | 1/1943 | Mathis et al. | 166/295 |
| 2,796,934 | 6/1957 | Vogel | 166/295 |
| 3,123,137 | 3/1964 | Young et al. | 166/295 |
| 3,199,590 | 8/1965 | Young | 166/295 |
| 3,378,071 | 4/1968 | Sparlin | 166/295 |
| 3,393,739 | 7/1968 | Rosenberg | 166/295 |

OTHER PUBLICATIONS

Young, Bill M. Consolidation Technique In Clayey Sands Boosts Flow Rate In Oil & Gas J., 9–18–67, pp. 107– 109
Chem. Abstracts, 59:1048b
Delmonte, John Furane Resins in Modern Plastics Encyclopedia for 1965. N.Y., McGraw-Hill, p. 207

*Primary Examiner*—Stephen J. Novosad
*Attorney*—A. L. Snow, F. E. Johnston, Ralph L. Freeland, Jr. and E. J. Keeling

[57] ABSTRACT

Porous earth formations are sealed by alternately injecting concentrated phosphoric acid and furfuryl alcohol into the formations.

11 Claims, No Drawings

METHOD FOR SEALING EARTH FORMATIONS

BACKGROUND OF THE INVENTION

1. Field of the Invention

Oil field operators frequently must contend with the problem of poor distribution profiles in water injection wells and with the problem of excessive water influx in producing wells.

During secondary recovery of oil by water flood, it is frequently found that areas of high permeability exist at points along the interior of the well into which flood water is being injected. Instead of providing the desired uniform sweep through the formation, the flood water channels through zones of high permeability, "thief zones," and finds its way to a producing well without having served any useful purpose.

During production from many oil wells, very high water to oil ratios are observed in the production stream due to the flow of excessive amounts of water into the well from zones of high permeability in the formation.

These problems are well known in the petroleum industry and considerable effort has been expended in providing solutions for them by sealing off highly permeable areas of the formation.

2. Description of the Prior Art

U.S. Pat. No. 2,019,908 proposes to seal formations by injecting silicon tetrachloride into an earth formation where it hydrolyzes to form a solid deposit.

U.S. Pat. No. 2,014,119 proposes to inject a sodium salt of a sulfonic sludge acid and then a water solution of a calcium salt into an earth formation. The two materials react and deposit the calcium salt of the sludge acid in the interstices of the formation.

U.S. Pat. No. 2,248,028 proposed to inject styrene into an earth formation and polymerize the styrene in the interstices of the formation.

Other proposals to seal earth formations by producing a solid deposit or a polymer in the interstices of the formations are shown in U.S. Pat. Nos. 2,204,223, 2,208,766, 2,274,297, 2,348,484, 2,476,015, 2,492,212, and 2,674,322.

SUMMARY OF THE INVENTION

Pursuant to this invention, concentrated phosphoric acid and furfuryl alcohol are alternately injected into earth formations where they react to form a hard bulky solid polymer which fills the interstices between formation particles and adheres to the particles. The acid and alcohol are separately injected into the formation. After injection of a quantity of one of them and before injection of the other, a quantity of a liquid, chemically inert to both, such as diesel oil, is injected to keep the two apart and prevent chemical interaction during injection and before they become dispersed in the formation.

DESCRIPTION OF THE PREFERRED EMBODIMENTS

Furfuryl alcohol is a low viscosity compound catalyzed by acids to form a hard, dense, thermosetting polymer much like Bakelite; this reaction is also accompanied by high heat release. While furfuryl alcohol can be polymerized by contact with mineral acids generally, phosphoric acid, though more expensive than other mineral acids, has marked advantage over other mineral acids in sealing earth formations pursuant to the method described herein. It wets and adheres to siliceous surfaces, presumably through hydrogen bonding; it is odorless, relatively noncorrosive, and easy to handle in the field.

When concentrated phosphoric acid and furfuryl alcohol are injected into the interstices of an earth formation and react there, the resulting polymer fills the interstices and has a cementing effect bonding the polymer formed to the formation particles and the formation particles to each other.

The effectiveness of the phosphoric acid-furfuryl alcohol to seal earth formations was first studied in cores of Berea and Boise sandstone. In a typical test the core is cleaned by washing with a chloroform-acetone mixture, dried at 120° C. and then vacuum saturated with distilled water. The water saturated core is placed in a Hassler cell and an overburden pressure of 350 psig is applied. Distilled water is forced through the core at varying pressures until constant permeability is observed at each pressure drop. The core is then flushed with diesel oil to remove water. Furfuryl alcohol is then injected into the core; it is followed by a diesel oil spacer and then by phosphoric acid.

In a typical core test a Berea sandstone core having a pore volume about 10 ml. and a water permeability about 250 md. was saturated with water. 10 ml. of diesel oil were injected into the core. This was followed by 10 ml. 85 percent phosphoric acid, 2 ml. diesel oil, and 4 ml. of furfuryl alcohol. When 4 ml. of furfuryl alcohol had been injected, the core plugged and no further liquid could be forced through it at the 100 psig injection pressure. The core was then subjected to a head of distilled water at 140 psig and there was no flow.

Numerous core tests established the effectiveness of the phosphoric acid-furfuryl alcohol reaction product to seal a variety of cores taken from representative oil bearing formations.

A number of Boise sandstone cores were plugged, some with the phosphoric acid-furfuryl alcohol process and others with commercial chemical plugging processes now available. These plugged cores were sealed, with water, in a pressure bomb and were heated to 500° F. under the autogenous pressure of saturated steam. After 2 weeks at temperature, only about 5 percent of the original permeability had returned in the phosphoric acid-furfuryl alcohol plugged cores, whereas most or all of the original permeability had returned in cores plugged by the other processes. Since many wells are now being injected with steam or hot water for secondary recovery of oil, it is important that the plugging processes used in such wells to prevent channeling of the secondary recovery fluids produce a plug which withstands high temperature.

The phosphoric acid-furfuryl alcohol system was then tested at full scale in working wells, as shown in the following examples.

EXAMPLE 1

A well in the Rangely Field in Colorado was in use as a water injection well in an assisted recovery operation. The injection interval was 70 feet, but it was found that the bulk of the water entering the formation entered through the bottom 5 feet of the 70-foot interval. In order to obtain more even distribution of the water entering the formation through the whole injection interval, the well was treated with phosphoric acid-furfuryl alcohol. To assure that the chemicals would not enter the formation above the 5-foot thief zone and plug off the desired injection interval, water was pumped down the annulus while the chemicals were pumped down tubing.

In sequence, 4 barrels of 80 percent phosphoric acid, 1.5 barrels of crude oil spacer, a wiper plug, 2 barrels of furfuryl alcohol, 2 barrels of water, a second wiper plug, and then enough water to displace the chemicals from the tubing and hole into the formation were sent down the tubing. After a 10-minute shutin period, 1 barrel of water was bled from the tubing and the well was again shut in. After an additional 10 minutes, 1 barrel of water was pumped back into the tubing. This procedure was repeated to facilitate mixing of the chemicals in the formation.

The well was then shut in for 6 hours, after which water injection was resumed. Injection profile surveys were made one day, three months, and fifteen months after the treatment, continuous water injection having been carried on in the well throughout that period. It was found that after the treatment less than 25 percent of the injected water was entering the 5-foot thief zone after fifteen months continuous injection.

EXAMPLE 2

A producing well near Coalinga, California, was in difficulty due to a number of shallow corrosion leaks scattered over 150 feet of casing. Formation water was entering the well through the casing leaks. The water level in the casing was lowered to hole bottom with air pressure and a retrievable bridge plug was set 1,200 feet below the lowest corrosion hole in the casing. Two barrels of 80 percent phosphoric acid were sprayed down the casing and were followed by one-half barrel of furfuryl alcohol which was sprayed into the casing. This process was repeated three times. The well was cleaned out and blown dry to the bridge plug. The following day the fluid level had not risen in the well, indicating that the formation adjacent the corrosion holes in the casing had been successfully plugged. The bridge plug was retrieved and the well was placed on production.

The foregoing examples provide clear evidence of the effectiveness of the phosphoric acid-furfuryl alcohol treatment of earth formations to reduce permeability.

It should be noted that the relative volumes of phosphoric acid and furfuryl alcohol used can be varied considerably. In large-scale sealing undertakings it is preferred to use a substantial volume excess of phosphoric acid, e.g., two to five volumes of acid per volume of furfuryl alcohol.

The liquid employed as a spacer between the phosphoric acid and furfuryl alcohol injections may be any liquid which is inert to both of them, relatively immiscible with both and somewhat more viscous than water. Crude oil or middle distillates from crude oils, such as kerosene or automotive diesel fuel, are excellent spacers.

The formation should be reasonably free of interstitial water when the acid is injected. Injection of the same liquid used as a spacer prior to injection of acid is a convenient and effective way to displace interstitial water.

I claim:

1. The method of sealing a permeable earth formation, which comprises separately introducing two reagents into the formation, said reagents consisting essentially of concentrated phosphoric acid and furfuryl alcohol.

2. The method as in claim 1 wherein the acid is the first reagent to be introduced.

3. The method as in claim 1 wherein the alcohol is the first reagent to be introduced.

4. The method as in claim 1 wherein prior to the introduction of the second reagent, a spacer liquid inert to both of said reagents is introduced in an amount sufficient to keep the acid and the alcohol apart until they have entered the formation.

5. The method of sealing a permeable earth formation adjacent to a well bore, which comprises separately introducing two reagents into the formation, said reagents consisting essentially of concentrated phosphoric acid and furfuryl alcohol, said acid being the first reagent introduced.

6. The method as in claim 5 wherein prior to the introduction of said alcohol, a spacer liquid inert to both of said reagents is introduced in an amount sufficient to keep the acid and alcohol apart until they have entered the formation.

7. The method as in claim 5 wherein prior to the introduction of said acid, an inert liquid is introduced into the formation to displace formation water.

8. The method of sealing a permeable zone adjacent to a well bore, which comprises separately introducing two reagents into the formation, said reagents consisting essentially of concentrated phosphoric acid and furfuryl alcohol, said acid being the first reagent introduced.

9. The method as in claim 8 wherein prior to the introduction of said acid an inert liquid is introduced into the formation to displace formation water.

10. The method as in claim 8 wherein prior to the introduction of said alcohol a spacer liquid inert to both of said reagents is introduced in an amount sufficient to keep the acid and alcohol apart until they have entered the formation.

11. The method of sealing a permeable earth formation comprising separately injecting phosphoric acid and furfuryl alcohol into the formation and contacting said acid and alcohol in said formation to form a reaction product thereby reducing the permeability of said formation.

* * * * *